Jan. 15, 1935.   L. E. WILKERSON ET AL   1,987,726
ADJUSTABLE MACHINE SUPPORT
Filed April 12, 1934
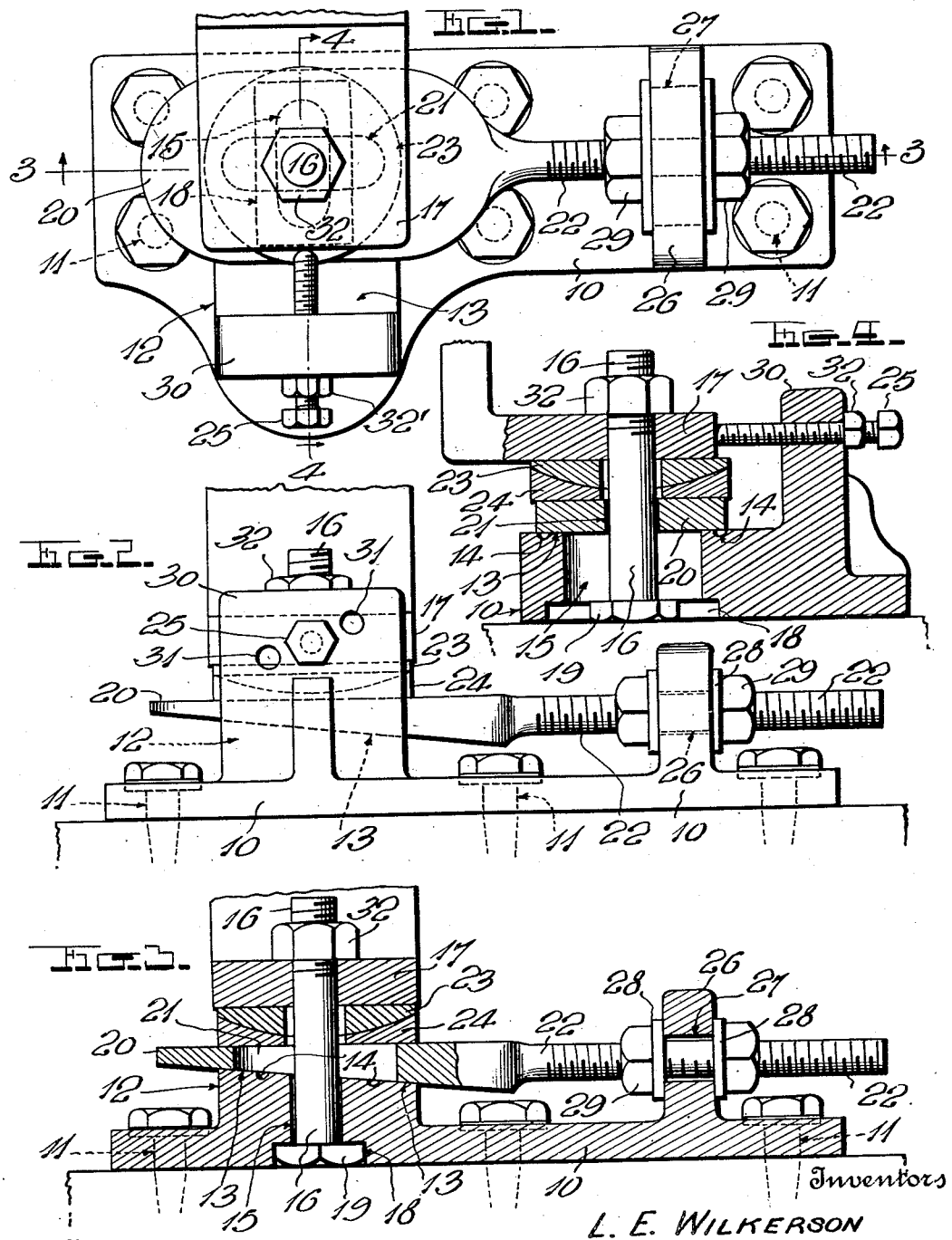
Inventors
L. E. WILKERSON
E. M. MAYNARD
Witness
H. Woodard Patented Jan. 15, 1935

1,987,726

UNITED STATES PATENT OFFICE 1,987,726

ADJUSTABLE MACHINE SUPPORT

Leonard E. Wilkerson and Emmett M. Maynard, Newport News, Va.

Application April 12, 1934, Serial No. 720,285

3 Claims. (Cl. 248—15)

The invention aims to provide a novel and advantageous support, one of which may be used under each supporting foot or the like of a motor or other machine, to either prevent or rectify misalinement, vibration, etc., and the invention is particularly adaptable for use in mounting the motors of motorboats in which misalinement very often occurs due to warping of the hull.

With the foregoing in view, the invention resides in the novel subject matter hereinafter described and claimed, description being accomplished by reference to the accompanying drawing.

Fig. 1 is a top plan view.

Fig. 2 is a side elevation.

Fig. 3 is a vertical longitudinal sectional view on line 3—3 of Fig. 1.

Fig. 4 is a vertical transverse sectional view on line 4—4 of Fig. 1.

Only one unit has been disclosed in the accompanying drawing and while this unit will be specifically described, it is to be understood that any desired number may be used at logical locations, and that minor variations may be made within the scope of the invention as claimed.

The numeral 10 on the drawing denotes a horizontally elongated flat base having openings 11 to receive lag screws or other fasteners. Near one of its ends, this base is provided with a transverse ridge or wedge supporting seat 12 integral with and projecting upwardly from its upper side, said seat having an inclined upper face 13 which may well be formed with an oil groove 14. The base 10 and seat 12 are provided with a slot 15 extending transversely thereof to receive an anchoring bolt 16 for one of the supporting feet 17 of the motor or other machine with which the invention is to be used, and the lower side of said base is formed with a groove 18 which slidably receives the head 19 of said bolt to hold the latter against rotation.

A wedge 20 rests slidably upon the surface 13 of the seat 12 and is provided with a longitudinal slot 21 through which the bolt 16 passes, said slot being disposed at right angles to the slot 15. One end of the wedge 20 is provided with an integral threaded adjusting shank 22 extending uni-directionally with the slot 21. Universal washers 23 and 24 are supported by the wedge 20 and the uppermost of these washers directly supports the foot 17. An adjusting screw 25 located at right angles to the shank 22 and positioned horizontally, is provided to abut this foot 17 to shift the machine transversely as may be required to attain the desired alinement, and vertical adjustment is effected by adjusting the wedge 20. The universal washers 23 and 24 insure solid support even though the foot 17 may necessarily be in a plane which is not parallel with the base 10.

At or near one of its ends, the base 10 is provided with an integral upstanding lug 26 having an opening 27 through which the shank 22 passes, said opening being of such size that said shank may move vertically therein as the wedge 20 moves upwardly or downwardly with adjustment, and of such size that said shank may move transversely in the opening as adjustments of the screw 25 are effected. Washer plates 28 through which the shank 22 passes, lie against opposite sides of the lug 26 and cover the opening 27, and two nuts 29 are threaded on said shank in contact with said washer plates. These nuts serve as adjusting means and as locking means for the wedge 20.

The base 10 is provided with a second integral upstanding lug 30 carrying the adjusting screw 25, said lug being integral with the ridge or seat 12 and being formed with a plurality of openings 31 at different elevations. The screw 25 may be threaded through any of these openings according to the height to which the foot 17 has been adjusted. A suitable lock nut 32' is provided for the screw 25, said nut abutting the lug 30.

When the proper number of the improved supports are used under any machine, the latter may be solidly supported by all of them to prevent vibration, and it may be adjusted vertically and horizontally as may be required. Not only is the invention simple and inexpensive, but it may be easily installed and adjusted and it will have no tendency to creep out of adjustment, for tightening of the nuts 29, the nut 32 of the bolt 16, and the lock-nut 32' of the screw 25, will tightly lock all parts in adjusted position.

While the details disclosed are preferably followed, attention is again invited to the possibility of making minor variations.

We claim:

1. An adjustable machine support comprising a base having openings to receive fasteners, said base having an integral wedge supporting seat upon its upper side, said base and said wedge supporting seat being formed with an elongated slot to receive a machine anchoring bolt, a wedge lying slidably upon said wedge supporting seat and having a slot at right angles to the aforesaid slot and adapted to receive said bolt, said wedge being provided at one end with a threaded adjusting shank extending uni-directionally with its slot, universal washers resting on said wedge to support an anchoring foot of the machine, a horizontal adjusting screw to abut said foot, said screw being disposed at right angles to said adjusting shank of said wedge, an upstanding lug integral with said base and having an opening through which said adjusting shank passes loosely, wedge adjusting means threaded on said adjusting shank and engaging said lug, and a second upstanding lug integral with said base and having an opening through which said adjusting screw is threaded.

2. A structure as specified in claim 1; the lower side of said base being formed with a groove to receive the head of said bolt and hold the latter against rotation.

3. An adjustable machine support comprising a flat elongated horizontal base plate for anchorage upon a support, one longitudinal edge of said base plate being provided with an integral upstanding lug in a plane parallel with the length of said base plate, the upper side of said base plate being provided with an integral ridge extending transversely thereof and integrally joined to said lug, the upper side of said ridge being inclined longitudinally of said base plate, a wedge resting on said inclined upper side of said ridge to support a machine foot, a horizontal adjusting screw for said machine foot threaded through the aforesaid lug, and adjusting means for said wedge operatively connected with said wedge and base plate.

LEONARD E. WILKERSON.
EMMETT M. MAYNARD.